(12) United States Patent
Demant et al.

(10) Patent No.: US 9,122,669 B2
(45) Date of Patent: Sep. 1, 2015

(54) FLAT SCHEMA INTEGRATED DOCUMENT ORIENTED TEMPLATES

(75) Inventors: Hilmar Demant, Karlsdorf (DE); Frank Schertel, Walldorf (DE); Johannes Bechtold, Tairnbach (DE); Olaf Meincke, Heidelberg (DE); Peter Eberlein, Malsch (DE); Thierry Tung, Gaiberg (DE); Eckhard Farrenkopf, Schriesheim (DE); Cheng Wang, Shanghai (CN); Ramesh B. G., Bangalore (IN); Juergen Sattler, Wiesloch (DE)

(73) Assignee: SAP SE, Walldorf (DE)

( * ) Notice: Subject to any disclaimer, the term of this patent is extended or adjusted under 35 U.S.C. 154(b) by 930 days.

(21) Appl. No.: 12/202,039

(22) Filed: Aug. 29, 2008

(65) Prior Publication Data

US 2010/0058169 A1    Mar. 4, 2010

(51) Int. Cl.
G06F 17/20    (2006.01)
G06F 17/24    (2006.01)

(52) U.S. Cl.
CPC .................................. *G06F 17/248* (2013.01)

(58) Field of Classification Search
CPC .................................................. G06F 17/248
USPC ......... 715/212, 221, 229, 234, 235, 243, 255; 705/1.1
See application file for complete search history.

(56) References Cited

U.S. PATENT DOCUMENTS

| | | | | |
|---|---|---|---|---|
| 5,819,293 A * | 10/1998 | Comer et al. | ......................... | 1/1 |
| 5,983,227 A * | 11/1999 | Nazem et al. | ......................... | 1/1 |
| 5,987,480 A * | 11/1999 | Donohue et al. | ............... | 715/207 |
| 6,026,433 A * | 2/2000 | D'Arlach et al. | ............. | 709/217 |
| 6,286,007 B1 | 9/2001 | Miller et al. | | |
| 6,591,272 B1 * | 7/2003 | Williams | ............... | 1/1 |
| 6,704,906 B1 * | 3/2004 | Yankovich et al. | ........... | 715/222 |
| 6,826,727 B1 * | 11/2004 | Mohr et al. | .................... | 715/235 |
| 7,107,525 B2 * | 9/2006 | Purvis | ........................... | 715/244 |
| 7,168,035 B1 * | 1/2007 | Bell et al. | ....................... | 715/234 |
| 7,281,018 B1 * | 10/2007 | Begun et al. | .......................... | 1/1 |
| 7,409,710 B1 | 8/2008 | Uchil et al. | | |
| 7,415,669 B1 * | 8/2008 | Davidson et al. | ............. | 715/234 |

(Continued)

FOREIGN PATENT DOCUMENTS

| | | | |
|---|---|---|---|
| EP | 1302867 A2 | 4/2003 | |
| EP | 1304614 A2 | 4/2003 | |

(Continued)

OTHER PUBLICATIONS

"European Application Serial No. 09010452.2, Extended European Serach Report mailed Apr. 14, 2010", 5 Pgs.

(Continued)

*Primary Examiner* — Cesar Paula
*Assistant Examiner* — Mohammed-Ibrahim Zuberi
(74) *Attorney, Agent, or Firm* — Schwegman Lundberg & Woessner, P.A.

(57) ABSTRACT

A method and system includes a server that provides a business management service to multiple independent customers. A template repository provides predefined templates, and a configuration storage stores customer changes to the predefined templates that represent customized templates. A user interface facilitates selection of customized templates as a function of scope of work for fine tuning.

18 Claims, 17 Drawing Sheets

(56) References Cited

U.S. PATENT DOCUMENTS

| | | | |
|---|---|---|---|
| 7,496,599 B2 | 2/2009 | Brundage et al. | |
| 7,562,304 B2 | 7/2009 | Dixon et al. | |
| 7,657,549 B2 | 2/2010 | Morris et al. | |
| 7,676,689 B1 | 3/2010 | Shioyama | |
| 7,703,003 B2* | 4/2010 | Payne et al. | 715/234 |
| 7,734,995 B1* | 6/2010 | Saikaly | 715/200 |
| 7,747,941 B2* | 6/2010 | Campbell et al. | 715/234 |
| 7,818,662 B2* | 10/2010 | Nene et al. | 715/224 |
| 7,882,489 B2* | 2/2011 | Chandrasekharan et al. | 717/106 |
| 7,890,478 B2* | 2/2011 | Fiedler | 707/694 |
| 7,899,892 B2* | 3/2011 | Tremblay et al. | 709/221 |
| 8,375,351 B2* | 2/2013 | Ahadian et al. | 717/101 |
| 8,806,357 B2 | 8/2014 | Demant et al. | |
| 2002/0184310 A1 | 12/2002 | Traversat et al. | |
| 2003/0093404 A1* | 5/2003 | Bader et al. | 707/1 |
| 2004/0088647 A1* | 5/2004 | Miller et al. | 715/500 |
| 2004/0143581 A1 | 7/2004 | Bohannon et al. | |
| 2004/0172592 A1 | 9/2004 | Collie et al. | |
| 2004/0230637 A1 | 11/2004 | Lecoueche et al. | |
| 2005/0203747 A1 | 9/2005 | Lecoeuche | |
| 2006/0173865 A1 | 8/2006 | Fong | |
| 2006/0236254 A1* | 10/2006 | Mateescu et al. | 715/762 |
| 2007/0016610 A1 | 1/2007 | Cohen et al. | |
| 2007/0044014 A1 | 2/2007 | Hanechak | |
| 2007/0074105 A1* | 3/2007 | McVeigh et al. | 715/513 |
| 2007/0208769 A1 | 9/2007 | Boehm et al. | |
| 2008/0059506 A1 | 3/2008 | Kalia et al. | |
| 2008/0117448 A1* | 5/2008 | Ijams et al. | 358/1.15 |
| 2008/0120283 A1 | 5/2008 | Liu et al. | |
| 2010/0057760 A1 | 3/2010 | Demant et al. | |
| 2010/0058170 A1 | 3/2010 | Demant et al. | |

FOREIGN PATENT DOCUMENTS

| | | | |
|---|---|---|---|
| EP | 1422619 A2 | 5/2004 | |
| EP | 1699007 A1 | 9/2006 | |
| EP | 1855241 A1 | 11/2007 | |

OTHER PUBLICATIONS

"U.S. Appl. No. 12/202,056, Non Final Office Action mailed Mar. 8, 2011", 16 pgs.

"European Application Serial No. 09010517, Extended European Search Report mailed Nov. 11, 2009", 11 pgs.

"European Application Serial No. 09010735.0, Search Report mailed on Dec. 4, 2009", 6 pgs.

Abiteboul, Serge, "On Views and XML", Proceedings of the 18th ACM SIGACT-SIGMOD-SIGART Symposium on Principles of Database Systems, (May 1999), 1-9 pgs.

Benedikt, M, et al., "Managing XML Data: An Abridged Overview", Computing in Science and Engineering vol. 6, No. 4, (Jul. 2004), 12-19.

Bossung, Sebastian, et al., "Automated Data Mapping Specification via Schema Heuristics and User Interaction", Proceedings of the 19 International Conference on Automated Software Engineering, (Sep. 2004), 10 pgs.

Braganholo, Vanessa P, et al., "PATAXO: A Framework to Allow Updates Through XML Views", ACM Transactions on Database Systems vol. 31, No. 3, (Sep. 2006), 839-886.

Groppe, Sven, et al., "Reformulating XPath queries and XSLT queries on XSLT views", Data & Knowledge Engineering vol. 57, No. 1, (Apr. 2006), 64-110.

Rajugan, R, et al., "Engineering XML Solutions Using Views", Computer Information and Technology, (Sep. 2005), 116-123.

"U.S. Appl. No. 12/202,049, Non Final Office Action mailed Jun. 9, 2011", 9 pgs.

"U.S. Appl. No. 12/202,056, Response filed Jun. 8, 2011 to Non Final Office Action mailed Mar. 8, 2011", 10 pgs.

"U.S. Appl. No. 12/202,049 , Response filed Sep. 9, 2011 to Non Final Office Action mailed Jun. 9, 2011", 8 pgs.

"U.S. Appl. No. 12/202,049, Examiner Interview Summary mailed Jun. 7, 2012", 3 pgs.

"U.S. Appl. No. 12/202,049, Final Office Action mailed Feb. 2, 2012", 11 pgs.

"U.S. Appl. No. 12/202,049, Non Final Office Action mailed Jun. 24, 2013", 10 pgs.

"U.S. Appl. No. 12/202,049, Notice of Allowance mailed Dec. 26, 2013", 12 pgs.

"U.S. Appl. No. 12/202,049, Notice of Non-Compiant Amendment maild Nov. 28, 2011", 3 pgs.

"U.S. Appl. No. 12/202,049, Response filed Jun. 4, 2012 to Final Office Action mailed Feb. 1, 2012", 9 pgs.

"U.S. Appl. No. 12/202,049, Response filed Oct. 24, 2013 to Non Final Office Action mailed Jun. 24, 2013", 9 pgs.

"U.S. Appl. No. 12/202,049, Response filed Nov. 30, 2011 to Notice of Non-Compliant Amendment mailed Nov. 28, 2013", 9 pgs.

"U.S. Appl. No. 12/202,056 , Response filed Aug. 23, 2013 to Final Office Action mailed Jun. 27, 2013", 9 pgs.

"U.S. Appl. No. 12/202,056, Advisory Action mailed Sep. 25, 2013", 4 pgs.

"U.S. Appl. No. 12/202,056, Decision on Pre-Appeal Brief mailed Nov. 19, 2013", 2 pgs.

"U.S. Appl. No. 12/202,056, Final Office Action mailed Jun. 27, 2013", 21 pgs.

"U.S. Appl. No. 12/202,056, Final Office Action mailed Sep. 2, 2011", 21 pgs.

"U.S. Appl. No. 12/202,056, Non Final Office Action mailed Nov. 26, 2012", 19 pgs.

"U.S. Appl. No. 12/202,056, Response filed Apr. 26, 2013 to Non Final Office Action mailed Nov. 26, 2013", 9 pgs.

"U.S. Appl. No. 12/202,056, Response filed Nov. 2, 2011 to Final Office Action mailed Sep. 2, 2011", 10 pgs.

"U.S. Appl. No. 12/202,056, Pre-Appeal Brief Request filed Sep. 26, 2013", 5 pgs.

"U.S. Appl. No. 12/202,049, PTO Response to 312 Amendment mailed Apr. 8, 2014", 2 pgs.

"European Application Serial No. 09010735.0, Office Action mailed Sep. 9, 2014", 98 pgs.

"Final Technical Report—Case and Model Driven Dynamic Template Linking", BBN Technologies. Sponsored by Defense Advanced Research Projects Agency. DARPA Order No. J934, (Jun. 2005), 60 pgs.

"European Application Serial No. 09010452.2, Office Action mailed Jan. 24, 2011", 5 pgs.

\* cited by examiner

Excel Template Repository

Owner Eric Butler    Version SAP Default    Business Option Embedded Service: Office and Desktop Integration: MS Office Integration: MS Excel Integration    Personalize Help

[Save] [Cancel]

Please choose the following application screen to configure its excel template

Application Screens

| Application Screen | Description | Belong to Application Area |
|---|---|---|
| Quotes Comparison | This screen is to compare quotes in RFQ process | Supply Chain Management |
| Export My Employees List | This screen is to export my employees list | Human Capital Management |
| Maintain Forecast | This screen is to maintain the forecast data | Supply Chain Management |
| Product Planning Details | This screen is to show product planning details | Supply Chain Management |
| Resource Load Profile | This screen is to show resource load profile | Supply Chain Management |
| Other screens (Generic Screens) | They are all screens in A1S except the 5 specified screens above | All |

Excel Template of Quotes Comparison

The selected application screen has a master template provided by SAP. You can create the new template by following steps:
1. Download a template to your local machine.
2. Edit the template based on your own requirement, then save as XML.
3. Upload your template (XML) to system.

[Download] | [Upload] | [Delete]

| Excel Template | Created by | Date Modified | Set as available template |
|---|---|---|---|
| ☒ Quotes comparison master template (Provided By SAP) | SAP | | ● |
| ☒ Quotes comparison customerized template 1 | Terry Lang | 13/12/2006 11:45 | ○ |
| ☒ Quotes comparison customerized template 2 | Terry Lang | 17/12/2006 10:12 | ○ |
| ☒ Quotes comparison customerized template 3 | Terry Lang | 18/12/2006 10:14 | ○ |

*FIG. 4*

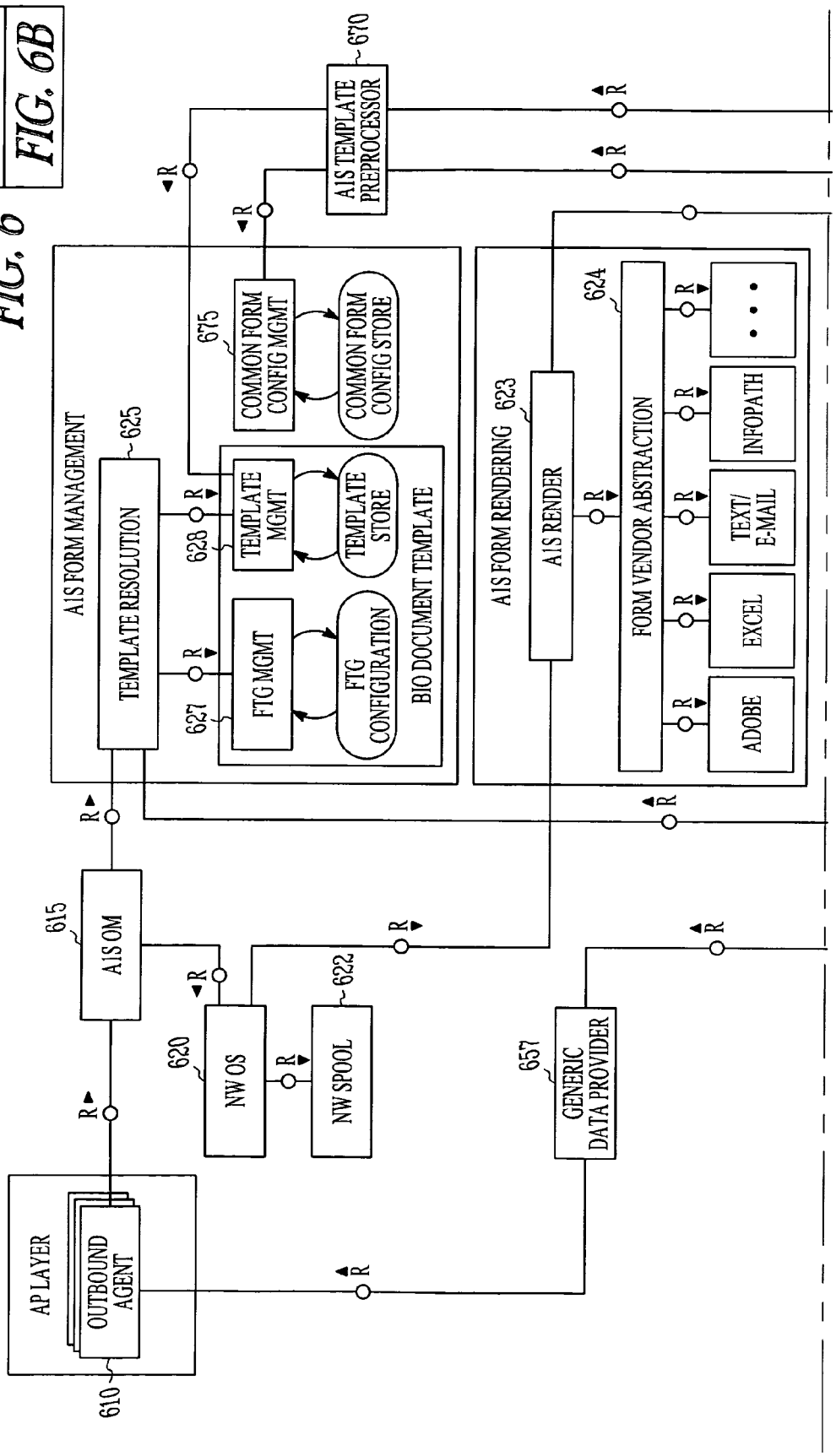

| UUID | LANGUAGE | INDUSTRY | COUNTRY | REGION | VERSION | INTERNALID |
|---|---|---|---|---|---|---|
| 4711 | DE | OIL | - | - | 1 | 1 |
|  | DE | OIL | - | - | 2 | 2 |
|  | EN | OIL | US | - | 1 | 3 |
|  | EN | OIL | US | - | 2 | 4 |
|  | EN | OIL | UK | - | 1 | 5 |
|  | EN | OIL | UK | - | 2 | 6 |
|  | EN | OIL | - | - | 1 | 7 |
|  | FR | OIL | FR | - | 1 | 8 |
|  | DE | - | - | - | 1 | 9 |
|  | EN | - | - | - | 1 | 10 |
|  | EN | WATER | - | - | 1 | 11 |
|  | EN | WATER | US | - | 1 | 12 |
|  | EN | WATER | US | CA | 1 | 13 |

*FIG. 7B*

```
<xs:element name="Customer">
  <xs:annotation>
    <xs:appinfo>
      <sap:sapA1SProperty>
        <sap:flatToDeep>
          <sap:root>true</sap:root>                    ← INDICATES THE ROOT IN TARGET
          <sap:destination>Customer</sap:destination>  ← INDICATES THE DESTINATION ELEMENT
        </sap:flatToDeep>                                                    ⌐1510
      </sap:sapA1SProperty>                            ⌐1505
    </xs:appinfo>
  </xs:annotation>
  <xs:complexType>
  ...
</xs:element>
```

FIG. 15

```
<xs:element name="Telephone1">
  <xs:annotation>
    <xs:appinfo>
      <sap:sapA1SProperty>
        <sap:flatToDeep>           Telephone1 transforms to A which is a child node of Telephone
          <sap:destination>Telephone\A</sap:destination>  ─── DESTINATION COULD BE AT A DIFFERENT LEVEL
        </sap:flatToDeep>                                 ⌐1605
      </sap:sapA1SProperty>
    </xs:appinfo>
  </xs:annotation>
</xs:element>
```

FIG. 16

FLAT SCHEMA INTEGRATED DOCUMENT ORIENTED TEMPLATES

RELATED APPLICATIONS

U.S. Application entitled, Plug-ins for Editing Templates in a Business Management System filed Aug. 29, 2008 as U.S. application Ser. No. 12/202,049; and U.S. Application entitled, Generic Data Retrieval filed Aug. 29, 2008 as U.S. application Ser. No. 12/202,056.

BACKGROUND

Templates are commonly provided for many different types of documents. The templates facilitate batch processing that may pull information from a database to fill in placeholders of a template and result in customized documents. Some examples include a mailing to multiple customers. The address field and salutation may be placeholders in a template of the mailing, and when filled in with data from a customer database, each customer may be mailed a letter that is personalized. Other examples may include invoices, purchase orders and many other types of business documents produced by many different types of programs, from word processors to spreadsheet programs.

In server oriented business management systems, many different clients may be served by a single system, which may consist of multiple computers and storage devices coupled to the clients via network. Templates in such systems may be treated as a development object. Development objects are available across all clients, while the data to populate the templates for each client is separated between clients. Since the development objects have global aspects, which means that they are available to all the clients, a template change instigated by one client will show up in the template for all clients. Such a change may not be desired by all clients.

BRIEF DESCRIPTION OF THE DRAWINGS

FIG. 4 is an example screen shot of a template repository according to an example embodiment.

FIGS. 6A and 6B are a block diagram of a component view during runtime according to an example embodiment.

FIG. 7B is a table illustrating variants for an example business object document template design according to an example embodiment.

FIG. 15 illustrates schema definition annotations used to deliver schema transformations according to an example embodiment.

FIG. 16 illustrates schema definition annotations used to deliver schema transformations according to an example embodiment.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

In various embodiments, a system includes a server that provides a business management service to multiple independent customers. The server has a template repository having predefined templates that may be used by customers for tasks such as a mass mailings. The templates are stored as content, and not as development objects. A configuration storage stores customer changes to the predefined templates to provide customized templates. A user interface facilitates selection of customized templates as a function of scope of work and customized templates available for fine tuning corresponding to the scope of work. In this manner, customers may create customized templates that need not be shared across the entire set of customers using the system. A common base for templates like Adobe® print forms, Excel download templates, text templates and many other types of templates may be provided.

Figure 1:
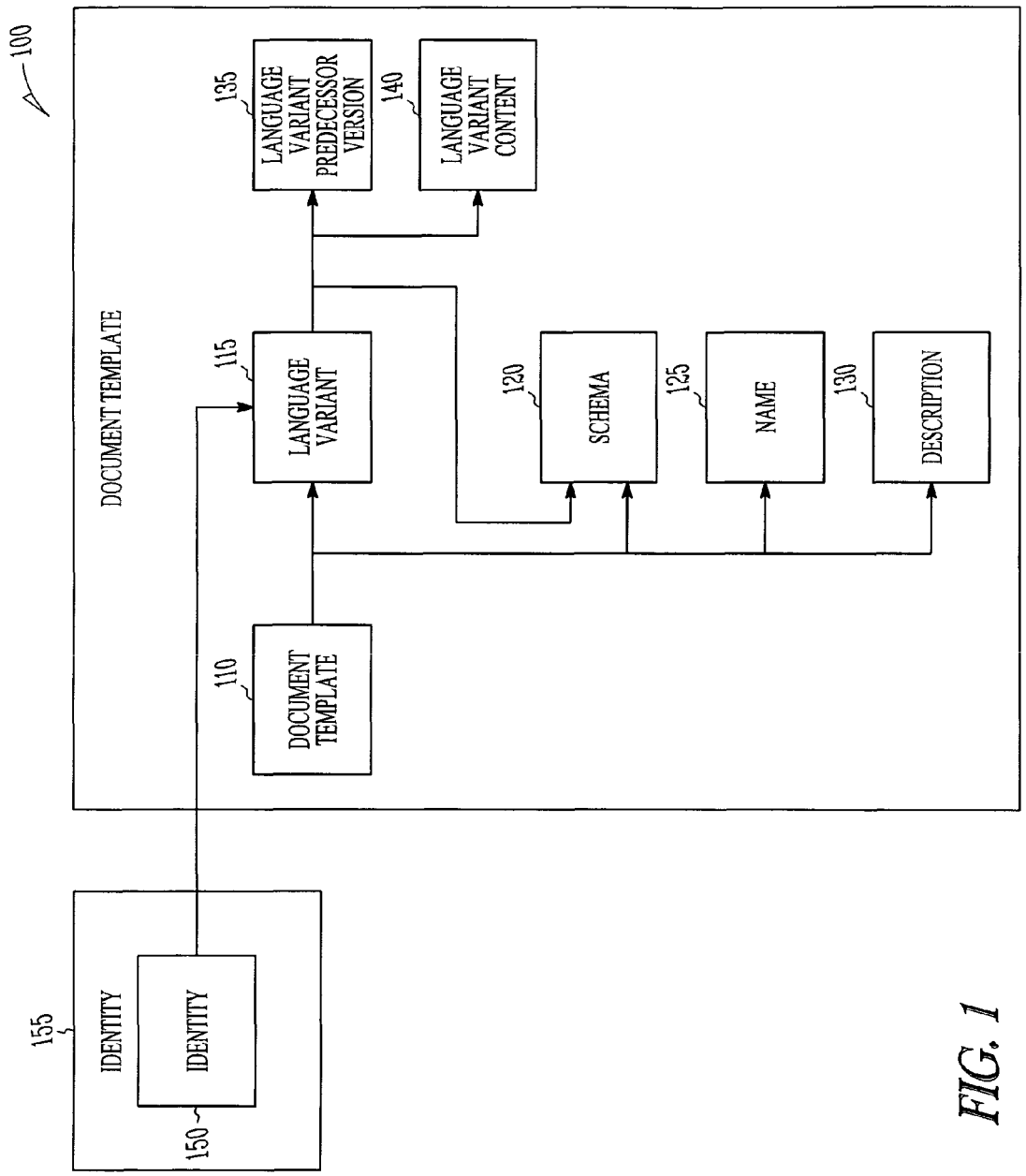
FIG. 1 is a block diagram illustrating a document template stored on a business management system according to an example embodiment.

FIG. 1 is a block diagram illustrating a document template 100 stored on a business management system according to an example embodiment. Template 100 is a business object that defines the content, format, placeholders, and the structure for creating new documents having a uniform style. Business objects are objects used in a business management system to represent business processes. They contain data related to the business process, as well as methods for processing the data. In one embodiment, the business object, template 100, belongs to a process component referred to as document management. This process component treats template 100 as content as opposed to a development object.

Business objects, as described above, are a technical representation of a concept that includes data and logic. In some embodiments, a business object has a structure that includes a root node and sub nodes. The nodes hold information such as data and logic corresponding to various business processes that can be modified in a design time environment.

Placeholders may be thought of as variables in a template 100 that refer to data to be looked up in a database when documents are created based on template 100. One way to represent the placeholders is in a well-structured XSD-XML-schema. Such a schema may be used to represent data which is organized in a hierarchical way with dependencies and different multiplicities. Placeholders provide for customization of the documents. In one example, template 100 is a template for a word processing application, spreadsheet application, or other application that can be used for mass mailing via an output management function, or to create reports via a spreadsheet application integrated with preconfigured content.

A document template 100, as indicated at a document template node 110, contains meta information such as type and description and template content. Elements located at the document template node 110 are defined by data type: DocumentTemplateElements, and may include a UUID (universally unique identifier) for a document template, a MIMECode that specifies the MIMECode for a document template, a GroupCode that is a coded representation of a document template group according to their business content, and VersionEnabledIndicator that indicates whether versioning has been enabled for the document template. These elements may be used to respond to queries to provide a list of all document templates 100 that meet selection criteria specified by query elements.

Document template 100 has further subordinate nodes, such as a language variant 115, and some language variant filter elements including a language variant schema 120, name 125 and description 130. These are identified as nodes in FIG. 1. Template 100 is a simplified template illustrating only a language variant for one template. In further embodiments, many different types of variants may be handled by the document template node structure.

Schema 120 contains binding information which describes how placeholders in a document template 110 are replaced by real business object data for a language variant of the document template 110. The elements located directly at the node Schema 120 are defined by the data type: DocumentTemplateSchemaElements. These elements may include a language independent name of the schema, MainIndicator, that specifies whether schema 120 is the main schema. In one embodiment, the schema MainIndicator can only be set for one schema. The main schema is the schema 120 that is loaded first by an application, which is responsible for placeholder substitution. Schema 120 may also include a BinaryObject that describes the unstructured data in binary form.

Node name 125 is a language-dependent name of a document template 110. Elements located directly at the node Name 125 are defined by the data type: DocumentTemplateNameElements. These elements may include a name specifying the name of a document template. Node description 130 provides a language-dependent description of document template 110. The elements located directly at the node Description are defined by the data type DocumentTemplateDescriptionElements. These elements may include a description that specifies the description of the document template.

Node language variant 115 is a language specific variant of a document template 110. The elements located directly at the node language variant 115 may be defined by the data type, DocumentTemplateLanguageVariantElements. These elements may be a UUID, a VersionID that is a unique identifier of a document template variant, and a SystemAdministrativeData that is stored in a system. In one embodiment, CreationDateTime and LastChangeTime are relevant and used by the Template Language Variant. A LanguageCode may also be included, that defines the language in which the Document Template Variant is specified, a CountryCode defines the country for which the document template variant is specified, and a RegionCode defines the region for which the document template variant is specified.

The following composition relationships to subordinate nodes include a language variant predecessor version node at 135, and a language variant content node at 140.

From a business object identity node 150, a last change identity identifies the identity that changed the language variant 115. A creation identity identifies the identity that created the language variant 115.

Language variant predecessor version 135 is a list of all predecessing versions of a language variant 115. The elements located directly at the node language variant predecessor version 135 may be defined by the data type, DocumentTemplateLanguageVariantElements. These elements may include a UUID for a document template variant, a versioned that is a unique identifier of a document template variant, and SystemAdministrativeData that is administrative data that is stored in a system. CreationDateTime and LastChangeTime are relevant and may be used by the Template Language Variant. Further elements may include a LanguageCode that defines the language in which the Document Template Variant is specified, a CountryCode that defines the country for which the document template variant is specified, and a RegionCode that defines the region for which the document template variant is specified. From the business object document template 110 node language variant, language variant 115 is an explicit version of a language variant.

In one embodiment, language variant content 140 is the binary content of the document template language variant. In one embodiment, the node is provided due to potential large quantities of data, the determination of which may have lead to performance problems. The elements located directly at the node Language Variant Content 140 may be defined by the data type, such as BinaryObject that describes the unstructured data in binary form. Such unstructured data has also been referred to as binary large objects or BLOBs, and may include data such as image data.

In further embodiments, many other attributes of the template 110 may be defined. Such attributes may be added as additional metadata in one embodiment. Time dependency (template is eventually valid for a period of time like a fiscal year), or paper size (as a print form might be designed only for A4 or Letter US) are just a few examples of such attributes.

In one embodiment, things directly influencing parameters may be included as attributes on the language variant or template header node, which are in common for different kinds of templates. In yet further embodiments, the attributes may be related to industry or layer-ID which gives the opportunity to abstract from vendor specific industry solutions.

In one embodiment, soft attributes may be included. Soft attributes are specific to a template type or business context stored in a kind of property bag attached to the template. For example, papersize might only be applicable for print forms and therefore could go into such a property bag. The template infrastructure would still need to expose such soft attributes via query services by the application context using this templates, e.g. to query for a template variant in papersize="Letter US".

Figure 2:
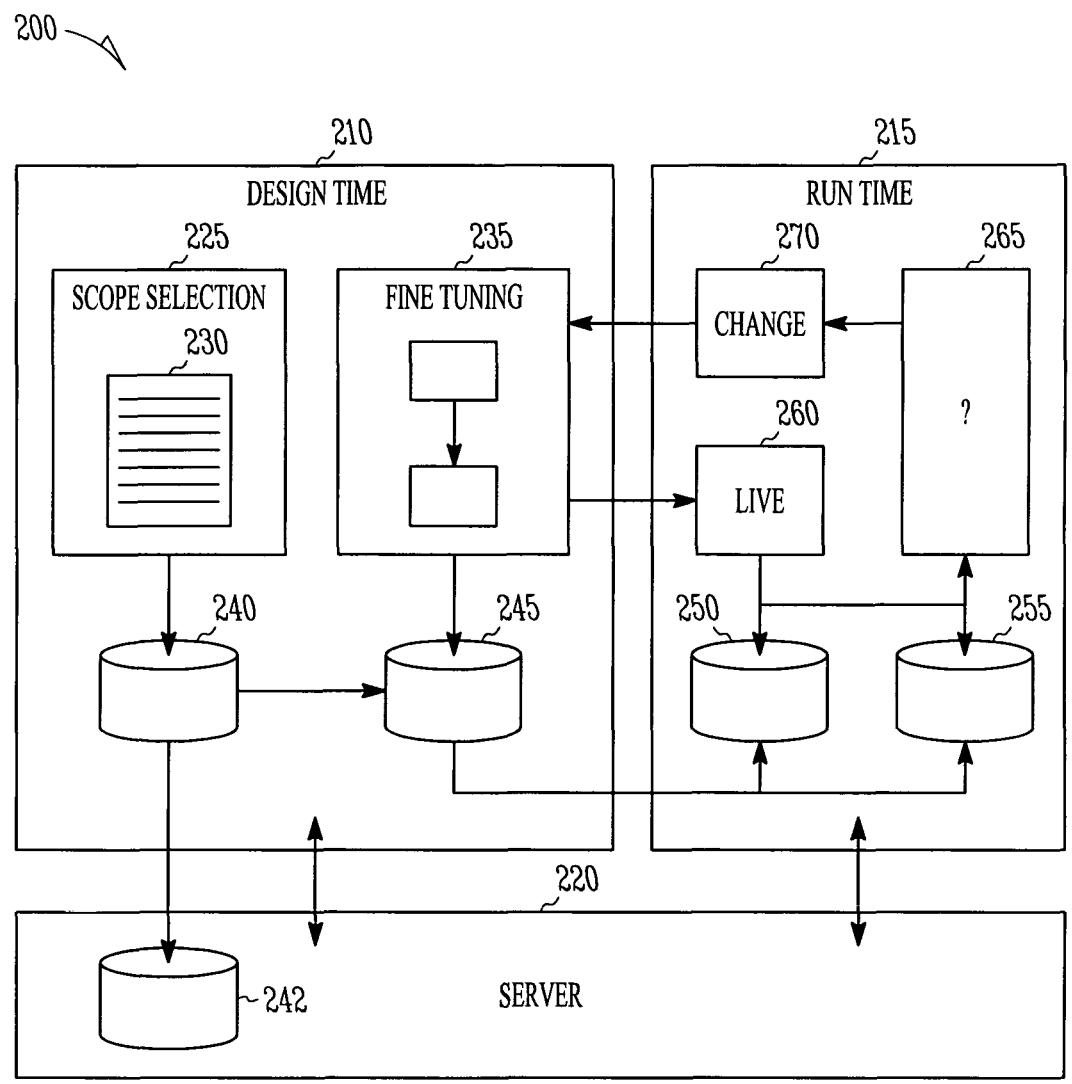
FIG. 2 is a block diagram of a system illustrating use of customized templates with a business configuration design time system and a run time system on a business management service backbone according to an example embodiment.

FIG. 2 is a block diagram of a system 200 illustrating use of customized templates with a business configuration design time system 210 and a run time system 215 on a business management service backbone 220. Utilizing the previous business object structure for templates, many different templates may be created from a set of standard templates. Customers may create their own customized templates. In system 200, deciding which templates to use for a customer is simplified. By storing the templates as business configuration objects, those objects may be selected and modified during normal design time business configuration processes as illustrated at design time system 210.

Design time system 210 provides for scope selection at 225. In one embodiment, scope selection 225 provides a list of areas, such as marketing, sales, after sales service, procurement, supply chain control, financials, etc. Each of these groups may be broken out into smaller groups. For example, financials may be subdivided into general ledger, which may be further subdivided into GL Accounts, set of books, etc. Other areas may also be listed.

When a customer selects one of the areas, at 235, a work item list of predefined templates for the customer is displayed. The list may be generated as a function of a customer profile that specifies the business objects of the customer that are available to that customer, including templates from the business configuration objects. In this manner, a customer will only see templates that may be needed based on the scope selection. At this point, the customer may select one of the templates for use, or may also select a template for further modification.

When the customer has selected a template, or has modified an existing template, decisions and changes are stored as indicated at storage 240, and are provided to the server 220 for storage at 242 and use by the run time system 215. The decisions and changes are also provided to run time system 215 via a storage 245. Run time system 215 includes a test tenant 250 and a production tenant 255. The decisions and changes are run through a run time checklist 260 to ensure that they are valid for live operation, and also through a production unit 265 and a continuous change component 270, which provides the modified templates back to the work item list 235 for future selection by the customer. In one embodiment, the moving of the templates from development objects to business configuration objects may be done with only very few changes in the runtime 215. The runtime 215 is switched to retrieve from a new persistency, the business configuration document template object, but the complete output process in printing need not be fundamentally changed.

One result of the selection of a template or modifying a template is that the template may be associated with a business task. When that business task is next run during run time, the associated template will be used, obtained by the runtime, and documents will be produced and mailed, or sent to an outside mailing service to be mailed in one embodiment involving mass mailings. The runtime may utilize the schema associated with the content of the template and customize the appropriate placeholders. This is one approach which enables dynamically changing the schema to fetch other or more different data from business object models. A further approach involves the use of a development object defining the interface for data-retrieval. Changing the development object may involve adaptation of a static interface and messages types. The schema in the latter case is just a proxy representation of the form message type where as in the first approach the schema is defining on its own how data is to be read.

In further embodiments, a postal service may be utilized for the mailing, or email, or fax may be used. In still further embodiments, an interactive form may be utilized that is sent to a supplier. It may be a purchase order in one embodiment. The business task may than retrieve the data from the form when it is returned, and store the data. The use of a template for such tasks may simplify dealing with different message formats, as it may include appropriate logic for interacting with the form.

Figure 3:
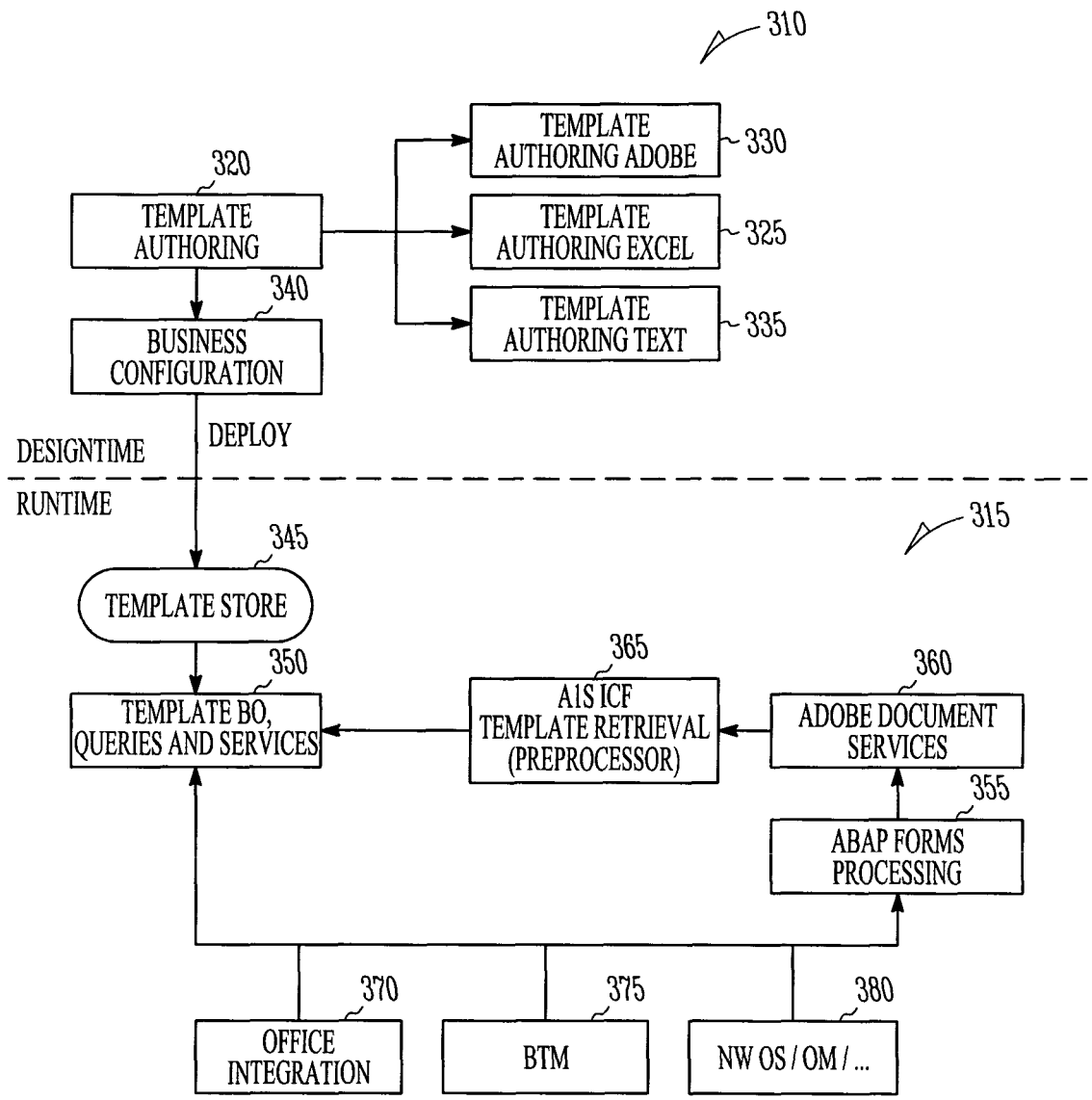
FIG. 3 is a block diagram illustrating a logical component view of handling document templates according to an example embodiment.

A logical component view of handling document templates is illustrated in block form in FIG. 3. The components are divided into design time generally at 310 and run time generally at 315. At design time 310, template authoring 320 may occur when a template is selected from a list of templates at 235 that are listed under a particular selected scope, such as an invoice template under a finances/invoices scope. When an Excel based template is selected, template authoring Excel at 325 is selected to allow the customer to further customize the template. If it is so customized, the changes will be stored, and a new template reflecting those changes will be created and stored. Further authoring may be provided for Adobe based templates at 330 and text template authoring at 335. The authoring blocks 325, 330 and 335 may be integrated editors, and the resulting templates are stored in fine tuning 235.

A business configuration block 340 is used to deploy the template in the form of a business configuration object. As a business object, the template includes business data that is exposed by one or more methods such as queries and other actions to use and manipulate the business data.

In runtime 315, the templates are stored at 345, and queries and services may be provided at 350 on such templates. In some embodiments, an additional layer may be provided which allows end-user related templates which are not present in the designtime. This additional layer provides further flexibility.

An example of processing an Adobe formatted template is illustrated by ABAP forms processing block 355, an Adobe document service block 360 and a system template retrieval and pre-processing block 365. These blocks provide rendering of the template and a callback into the runtime system when completed. The runtime also includes office integration 370, business task management (BTM) 375 and other system functions at 380.

FIG. 4 is an example screen shot of a template repository for Excel templates at 400 that can be displayed and viewed or modified by template authoring 325. A top portion 410 of the screen shot 400 describes the owner, version and business option corresponding to several different applications. At 415, a list of application screens is provided, and includes as an example only, quotes comparison, export my employees list, maintain forecast, product planning details, resource load profile and other screens. As indicated above, these screens may deal with many different types of business processes, such as finance related, and there may be many more available than those shown in the list at 415.

The application screen "quotes comparison" is highlighted in the list at 415. A corresponding list of actual templates corresponding to this quotes comparison scope is shown at 420. The list at 420 includes a first master template that is provided by the maker of the business management system. This master template may be available to all customers of the business management system, but it should be noted that the master template may be designed for the particular scope, quotes comparison, in this embodiment. Following the master template are several customized templates. The templates each have an associated creator, date of modification, and a selection button to indicate whether the template is to be included as an available template for that scope. This provides the ability to present an uncluttered interface back in the business configuration screens, allowing for easier navigation for users of the customer when setting up mass mailing or performing other tasks that utilize customized templates. For instance, a template may be obsolete. By not setting that template as available, it will not be mistakenly used. However it may still be retrieved to re-create prior documents if desired.

In one embodiment, an active flag may be used to indicate whether a template is available. One use for the active flag is to allow for resolving conflicting attribute combinations. A customer may decide which of eventually concurring variants should be the active one. This could happen if different ISVs ship the same templates for a given attribute context. Or, if a new language is shipped and the customer already has created a language variant in a previous version.

Figure 5:
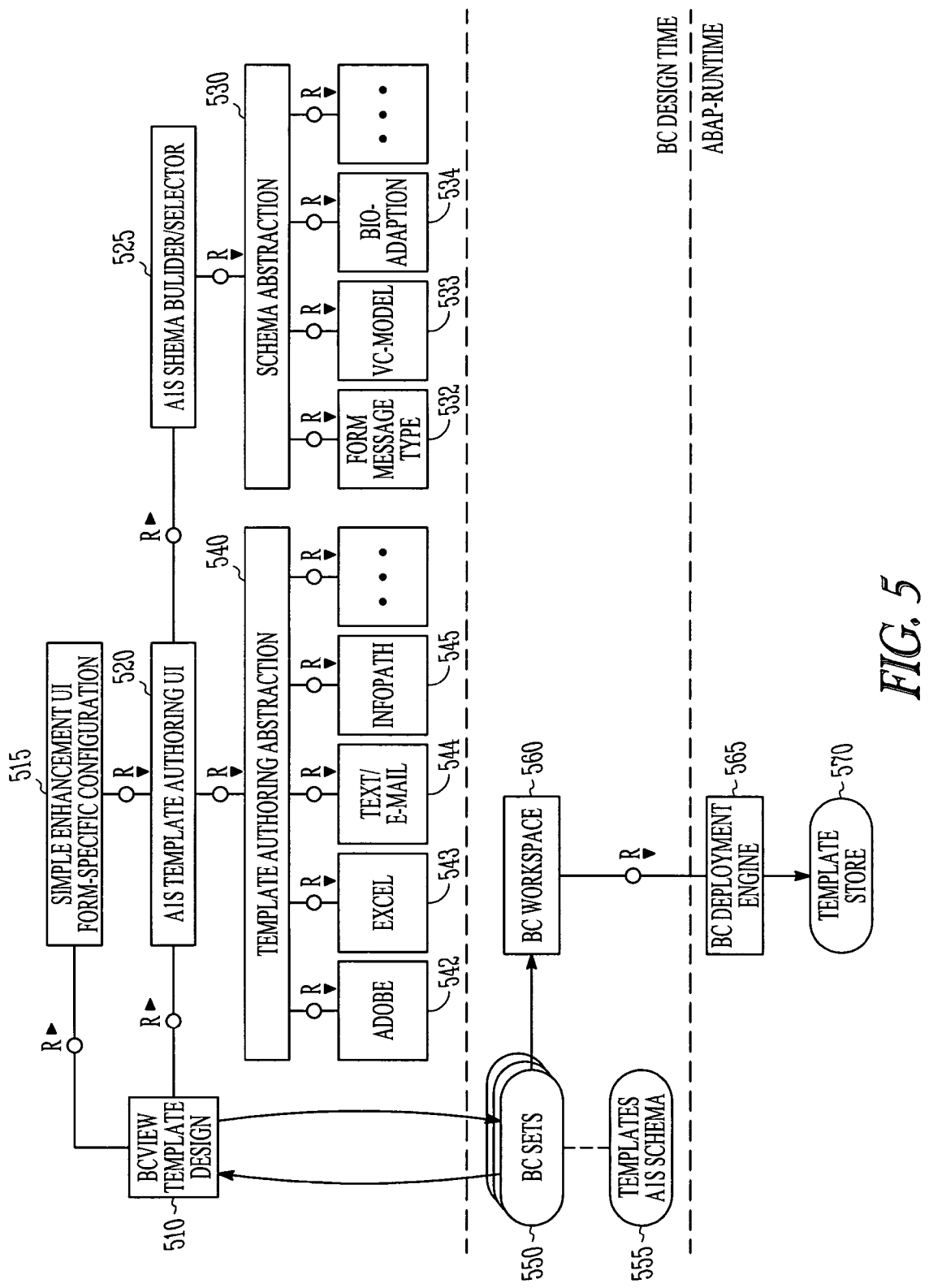
FIG. 5 is a block diagram illustrating components at design time according to an example embodiment.

FIG. 5 is a block diagram illustrating components at design time generally at 500. At 510, a user may select a template from a business configuration view of templates. In one embodiment, fine tuning on the selected template are kept separate form the business component. A request is made to a simple enhancement user interface 515 to modify the selected template. The user interface 515 generates a request to an authoring user interface at 520. In one embodiment, the template appears to a user to look very much like the resulting documents to be generated from the template. Complex data structures are hidden from the user by use of a schema builder/selector 525. A schema abstraction component 530 provides an abstraction from the actual data structures for messages 532, models 533, business objects 534 and other data structures, such as relational databases from which data is to be inserted into documents in accordance with the templates.

The ability to abstract the schema or data structure from the user enables the user to focus on the format of the actual resulting documents, as reflected in the template being edited. The template authoring user interface 520 thus provides an editor which abstracts completely from the schema. Word based templates appear as flowing text and paragraphs. The resulting printed page of a document derived from the template is the result of the same flow of text.

In one embodiment, a template authoring abstraction 540 is provided. The templates are represented in XML format by the abstraction, interfacing with the abstraction provided via requests from an Adobe type component 542, Excel component 543, text/email component 544 and InfoPath component 545. Other components may also be provided. The XML abstraction is provided to the template authoring UI such that a common set of editing functions may be provided for every template regardless of the original source of the template. The editing functions may be fairly limited to ensure that they operate on each type of template in the same way. For instance, some templates may utilize a pixel based approach. It may not be easy in all cases to just convert between pixel and text formats.

In one embodiment, the templates to select from at 510 are provided from business configuration sets 550. Configuration data is bundled together in one embodiment to form a container of data. The templates are schema based as indicated at 555 and may be built on top of a database table. A business configuration workspace 560 holds business configuration data for one customer going through configuration. The modification of templates may be just one part of the configuration occurring. Constraints on branches of business processes may also be used to determine which business configuration sets 550 are needed.

On completion of the business configuration efforts, a request is made to a deployment engine 565 in a run time environment, and the templates are stored at 570 for use when performing business management functions. Each modification of a template in design time leads to a new version of the template. In the run time, the versions may be persisted separately. The run time can thus make the template or different versions of the templates accessible from applications. The desired template can be retrieve by a special identifier.

In one embodiment, a template may have one or more schemas. These schemas may be associated with different message types, such as one for printing or output, one for VC (visual composer), and business object adaption, which is a way to build views on business object models. The ability to have multiple schemas for a template removes prior limitations of using merges to obtain the different message types.

Figure 6B:
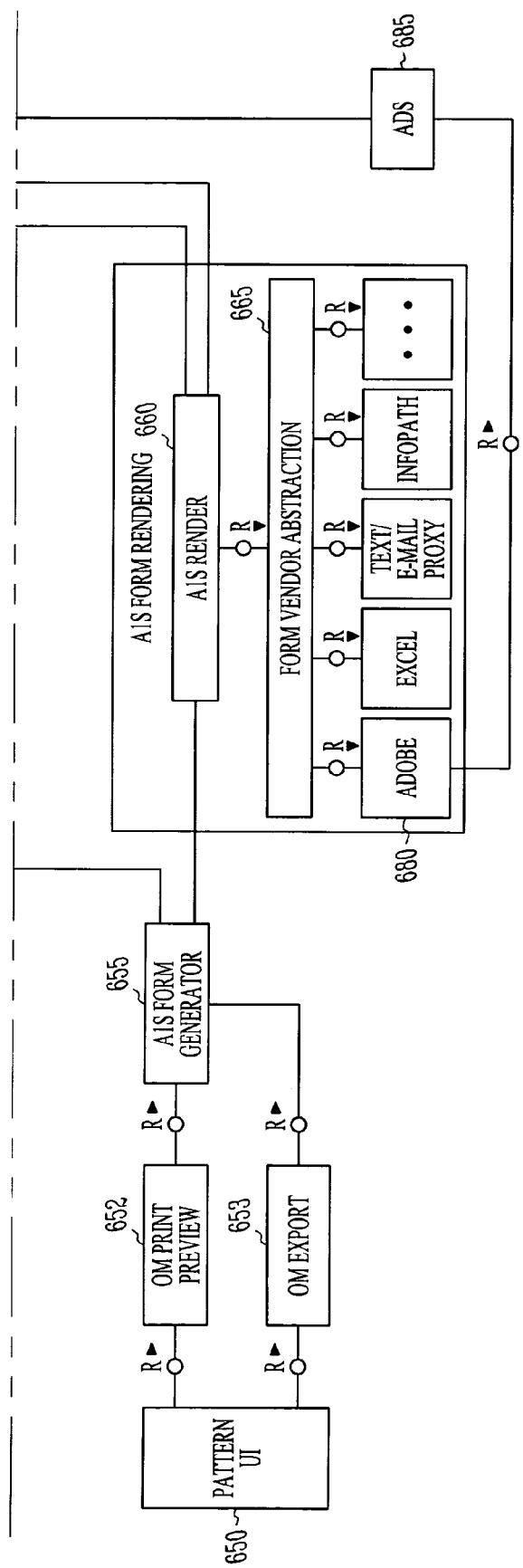

FIGS. 6A and 6B are block diagrams of a component view during runtime. Business object logic triggers an outbound agent 610 that generates a request to an output manager 615. Output manager 615 will determine whether the request is for a Net Weaver output service 620, and route it appropriately for handling by that service after template resolution at 625, fetching the data and rendering at 623. Output service 620 spools the requests at 622 until it can process them appropriately. Such processing may include sending a request to a renderer 623, which forms appropriate abstractions of the form from various vendor formats at 624 such as in an XML or other format as previously discussed.

If output manager 615 determines that the request is not for output service 620, the request is routed to a template resolution component at 625. Template resolution component 625 will find an appropriate template for use to perform the function that appears to be desired by a user. For instance, a user may not know the exact template to use, but does know that they want to print a purchase order in English. Using this information, the template resolution component 625 obtains the proper template and forms a request to either a FTG management component at 627 or template management component at 628, both corresponding to business object document templates.

In a further embodiment, requests may be generated by a pattern user interface at 650. The requests may be to an output manager print preview component 652 or an output manager export component 653. These components generate requests to a form generator 655. Form generator 655 then makes requests to one or more other components. One such request may be made to a generic data provider component 657, which in turn makes a request to outbound agent component 610. Form generator 655 may also make a request to the template resolution component 625, which handles such request in the same manner as request from output manager 615. In one embodiment, form generator 655, operating in a Java environment, may make a request to a second renderer 660, which also provides for abstraction of various different types of documents as indicated at 665. In non-Java environments, such requests may not be necessary. Renderer component 660 may also make a request to a template preprocessor 670, which can make a request to a common form configuration management component 675, or to the template management component 628 as desired. In a further embodiment, the form abstraction component, via an Adobe component 680 may make a request to an adobe document server 685, which also makes request to template preprocessor component 670.

Figure 7A:
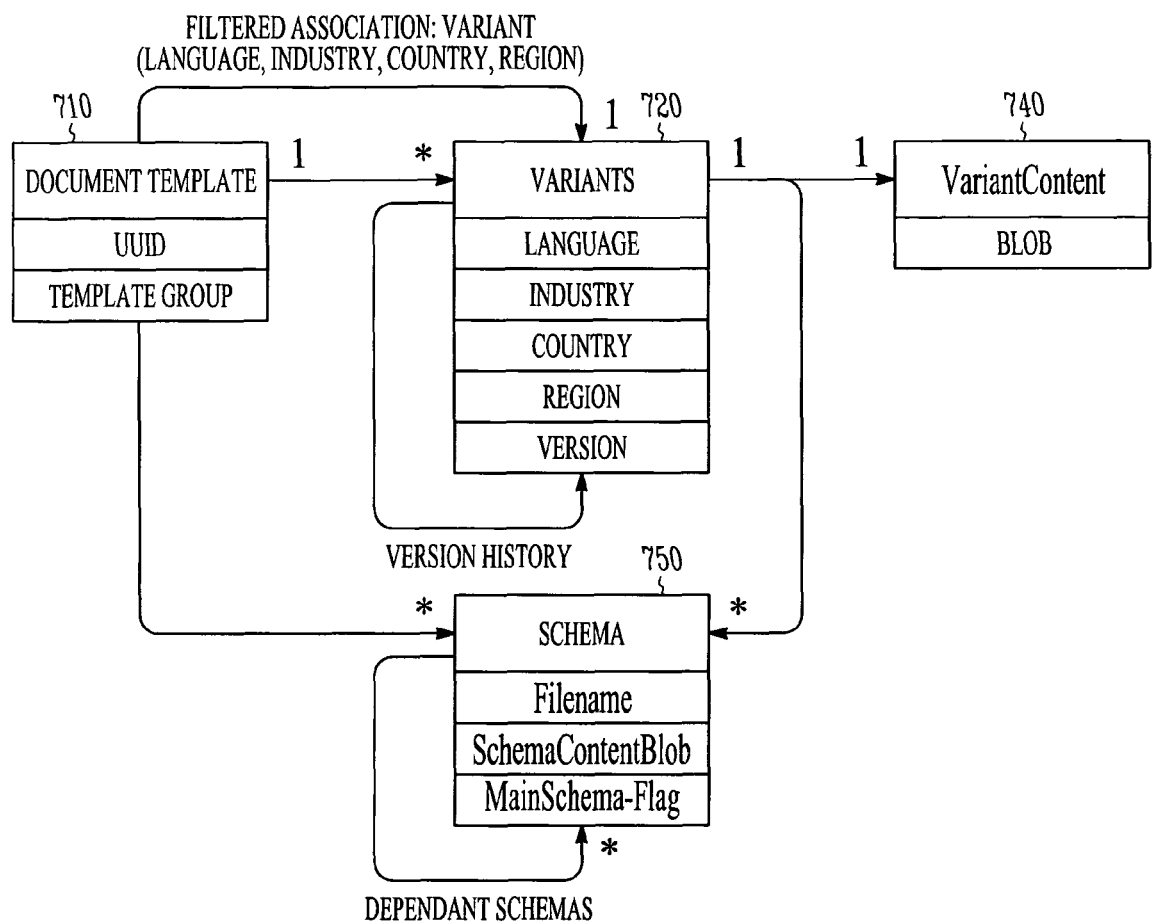
FIG. 7A is a block diagram of an example business object document template design according to an example embodiment.

FIG. 7A is a detailed block diagram of an example business object document template design 700 providing further detail than FIG. 1. Design 700 includes a document template UUID, and a template group code at 710. The template group code is a logical group around templates to assign them to a specific logical area. It can be used in queries to retrieve all templates within a template group. In one embodiment, the code list is an extensible code list.

The document template 710 is viewed as a logical concept with a unique identifier. In one embodiment, document template 710 has a name, which may be a short description visible to the user. The description may be language dependent and stored in a separate table. A description of the document template 710 may be used to describe the purpose of the template and is visible during business configuration. This description may also be language dependent and stored in a separate table. For one logical template, there may be variants for languages, industries, countries, regions and versions as indicated at node 720. Some example variants are shown in table 730 in FIG. 7B. A variant may have an internal GUID, which can be used to directly access the specific variant version. This may be useful for reprinting documents if needed. If some of the variants, such as industry, country, etc., are not used by an application, they can be left as empty or null. One template is persisted for each variant in one embodiment. In further embodiments, a mime type, such as XDP, XLS, plain/text, xhtml, etc., may be provided in a variants node.

Table 730 may be used by template resolution component 625 in FIG. 6 to find an appropriate template variant when a user does not uniquely specify the variant to use. Using information, including context information about the user and the user request, a best fit may be found in the table. If insufficient information is provided to uniquely identify a variant, a fall back sequence may be used to revert back to the template having matching information deemed more important. This is easily done if the templates are hierarchically arranged. For example, if language is not specified, the fall back may be an English language persisted template, or other predetermined language template.

Design 700 may also include variant content, such as a binary large object as indicated at node 740. In one embodiment, a schema is provided at 750. As previously noted, there may be more than one schema for each variant. All schemas may be related to a main schema root node shown. Each schema 750 has a file name, schema content and a main schema flag, which is set if the schema is the main schema.

A query application programming interface (API) may be provided to provide several different queries. A GetAllTemplatesByTemplateContainer query may be used to retrieve all templates in a template container. It may be used to fill a dropdown list in a user interface so that the user can choose a specific template. A GetDefaultTemplateInTemplateContainer query may be used to retrieve a default template within a template container. In one embodiment, a filtered association may be used in a query to retrieve a variant for a template starting from the root node of the template at 710. Language, industry, country, region may be used as inputs, and a variant ID is provided as an output. In one embodiment, a version is not part of the filter association query interface. Versions may be retrieved directly for special use cases with an internal shortcut ID.

Figure 8:
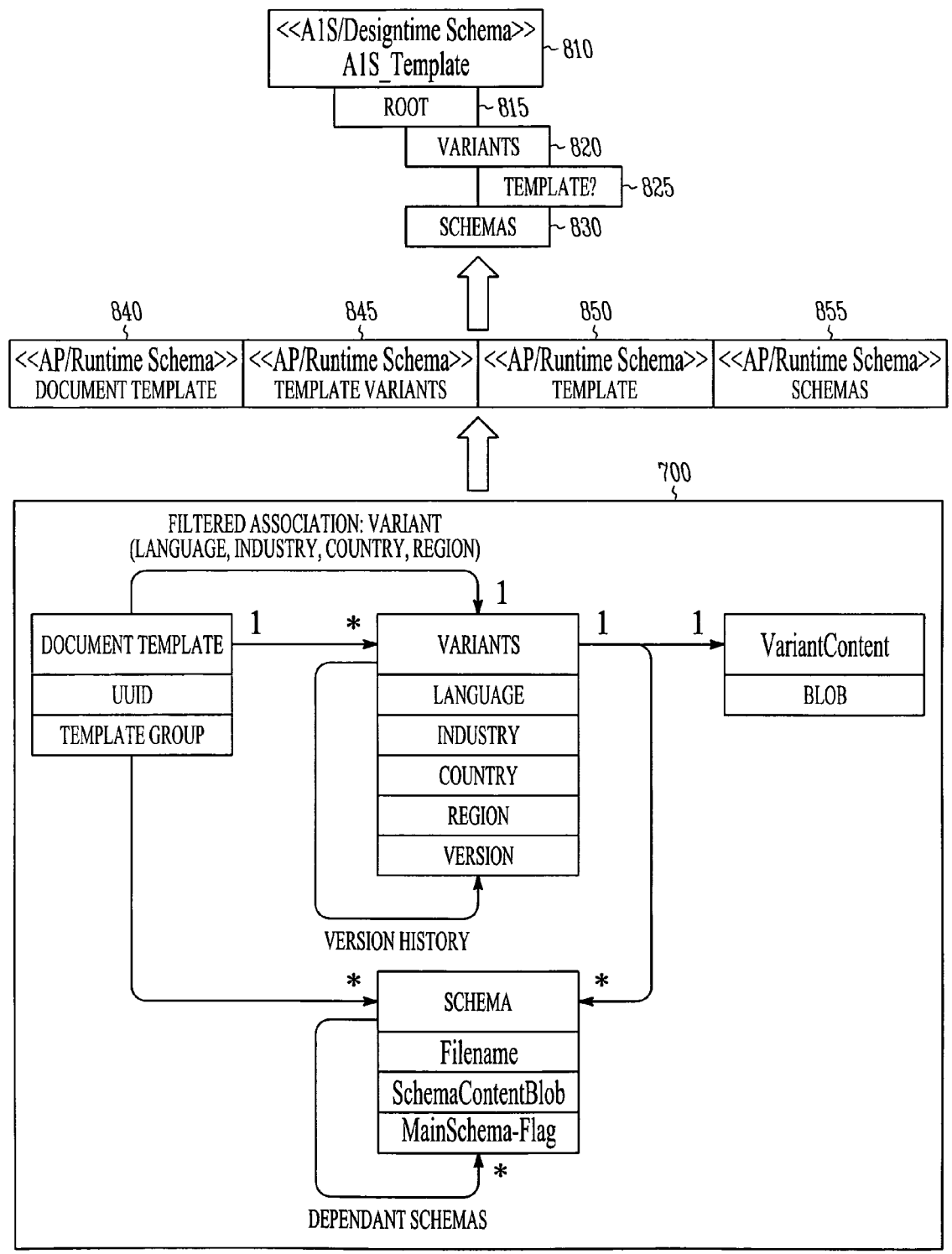
FIG. 8 is a block diagram illustrating business configuration integration of schemas for document templates according to an example embodiment.

FIG. 8 is a block diagram illustrating business configuration integration of schemas for document templates generally at 800. A top level design time schema 810 is exposed in terms of business configuration activities, including various nodes, such as a root node 815, variants 820, template 825 and schemas 830. These nodes may be exposed to allow modification by the user to create additional variants off a base template. In one embodiment, the template node 825 is not included in the design time schema to avoid increasing storage and work space size, as well as increasing load times.

The exposed nodes may be generated from a runtime template store business object document template indicated at 700, the same as shown at 700 in FIG. 7. The template 700 is translated into AP/runtime schemas as indicated at document template schema 840, template variants schema 845, template schema 850 and schemas 855. In one embodiment, one schema 855 is provided for each table in the schema node representation. Transformation rules may be applied to expose the design time schema 810 and other nodes used during business configuration. Such transformation may transform the run time versions to provide an XML version fur such use.

Figure 9:
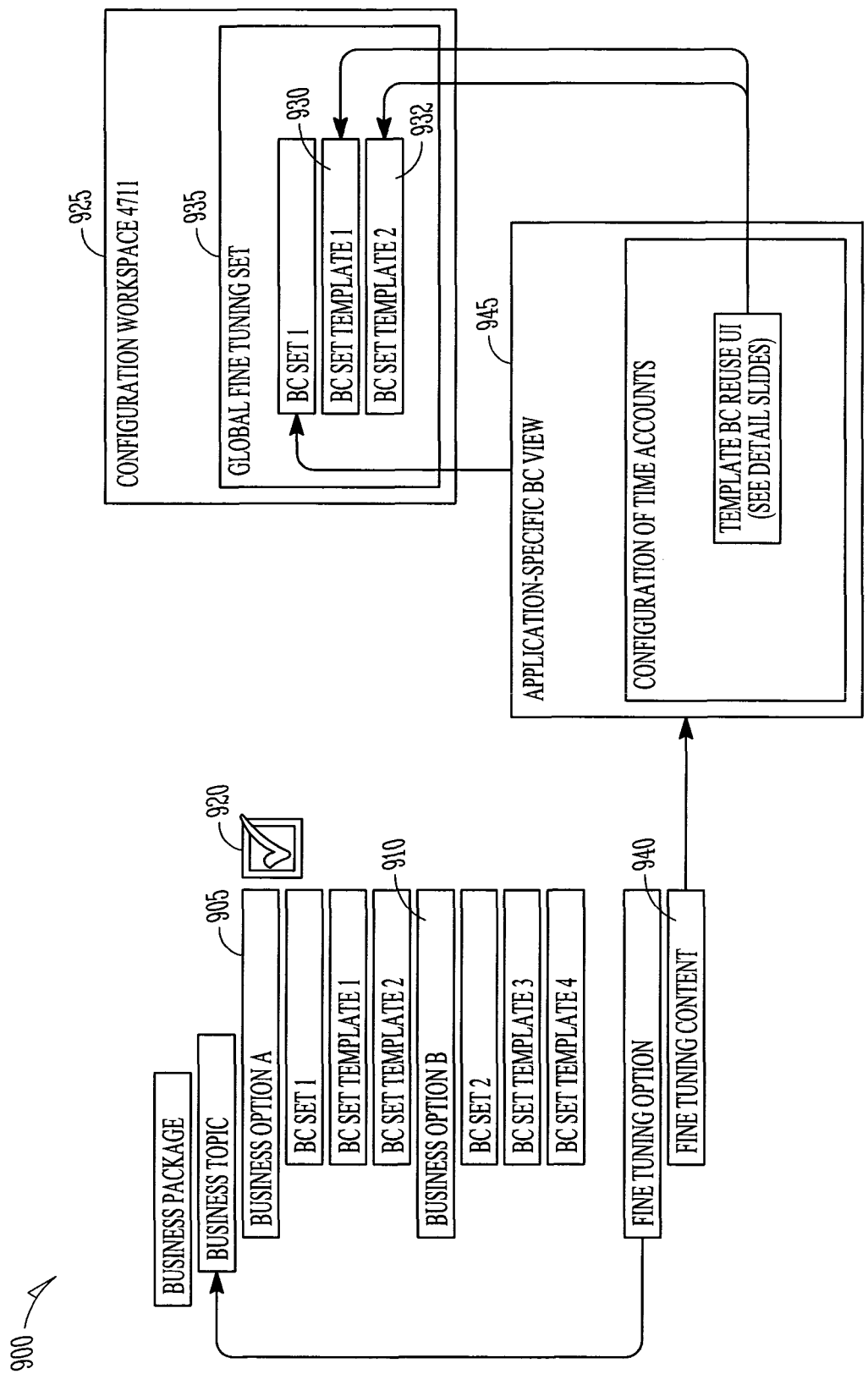
FIG. 9 is a block flow diagram illustrating fine tuning of templates during business configuration activities according to an example embodiment.

FIG. 9 is a block flow diagram 900 illustrating fine tuning of templates during business configuration activities. From a business adaptation catalog that provides multiple business options 905, 910 under a business topic 915, a user, such as a customer may select one or more options. Option A at 905 is indicated as selected at a check box 920.

The selection of option A results in a configuration workspace 925 having multiple templates associated with a selected business configuration set loaded as indicated at 930 and 932 in a global fine tuning set 935. The loaded sets correspond to sets assigned to the selected options.

Fine tuning may occur where a customer starts fine tuning via a fine tuning context 940 this is assigned to a fine tuning relevant option. Context 940 allows a customer to select templates. An application specific business configuration view 945 will thus select templates from the workspace 925. From the view 945, a customer can check and change the configuration data. A delta of the configuration made by the customer may be saved in the global fine tuning set.

Figure 10:
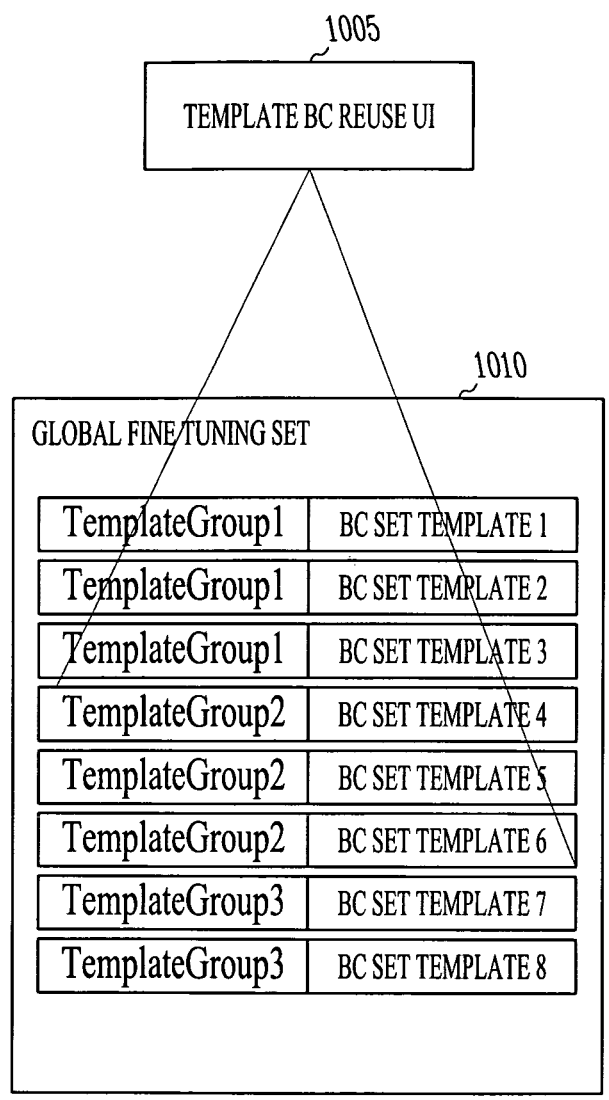
FIG. 10 is a block diagram illustrating a template business configuration reuse user interface according to an example embodiment.

In one embodiment, application specific business configuration view 945 includes a template business configuration reuse user interface as indicated at 1005 in FIG. 10. A global fine tuning set is indicated at 1010, and comprises a representation of templates by business configuration set and template group. The templates are stored in an abstract format to allow invoking of a correct editor.

In one embodiment, reuse user interface 1005 is invoked with a template group as a context-filter for the global fine tuning set in the business configuration workspace 925. The templates selected by this context may be displayed in the reuse user interface 1005. If a template is added anew, it exists in the business configuration template reuse user interface 1005. It may still not be persisted in the business configuration workspace 925. Therefore, the user interface 1005 offers a function to send a notification after something has changed along with the current ids and template names. When the business configuration view data is saved, it also invokes a save on the business configuration template reuse user interface.

Template content may be content of a runtime schema, so it is not part of a business configuration schema. The reuse user interface will have to deal with two separate schemas internally (in addition to the schema of the surrounding application business configuration view. In one embodiment, for transaction reasons, all content for the reuse user interface may be stored in a separate buffer within the reuse user interface, because multiple business configuration sets of the two schemas could be manipulated and potentially re-changed. Such sets may be managed via hashed-object lists in one embodiment.

The surrounding business configuration view may call a save function for its content and than call save in the reuse user interface and afterwards may call a do save to commit the changes to ensure that all changes are stored at the same time. In one embodiment, the reuse user interface provides the information if unsaved data is available and the surrounding business configuration view can ask the user if save should be applied.

In further embodiments, a cancel request results in a reversion back of the changes and initializes the reuse user interface again from the workspace/global fine tuning content. In one embodiment, XML template descriptions may be compressed prior to saving.

Figures 11, 12:
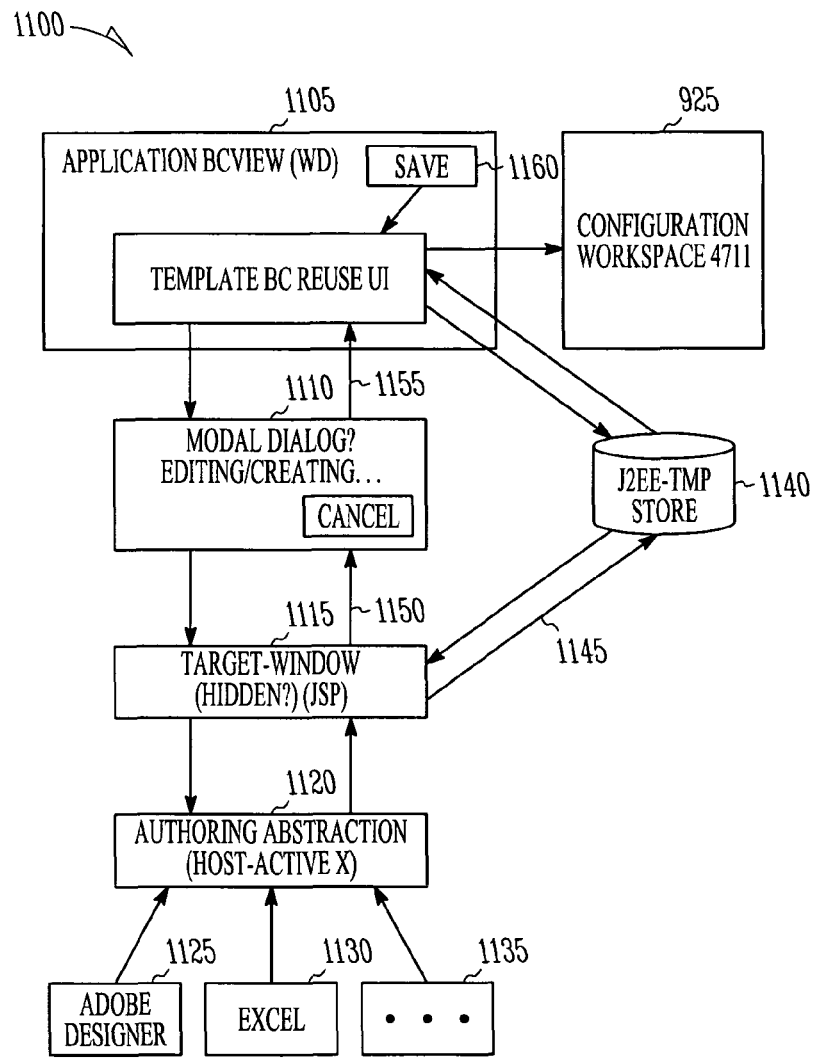
FIG. 11 is a block diagram illustration of a template authoring architecture according to an example embodiment.
FIG. 12 is a block diagram illustrating a list reuse user interface that provides a list of templates according to an example embodiment.

A template authoring architecture is shown generally at 1100 in FIG. 11. The architecture 1100 invokes editors for authoring templates, as well as editing existing templates using plug-ins corresponding to the native editor for the template being edited. An application business configuration view 1105 includes the template business configuration reuse user interface that may be used to invoke a modal dialog at 1110 so that a wrapper is provided for each template to be edited. The modal dialog 1110 launches a server page, such as a Java server page (JSP) at 1115 with a universal resource locator (URL) plus SSO (single sign on). At 1120, authoring is invoked through a host such as by ActiveX® type controls. Such controls allow developers to create software components that perform a particular function or a set of functions. Software may encapsulate functionality as controls so that the functionality can be embedded in other applications, such as on web pages. In further embodiments, editing functions may be seamlessly integrated in a host application.

Several different authoring abstractions are provided for native programs, such as Adobe Designer, Excel, and many word processing programs indicated at 1125, 1130 and 1135 respectively. Data from the authoring abstraction 1120 may be passed back to the JSP page at 1115 and may be temporarily stored at a temp store at 1140. A returned storage ID may be provided by the temp store 1140 as indicated at 1145. A portal event may be invoked as indicated at 1150 from JSP page 1115, and the dialog may be closed as indicated at 1155. Template business configuration reuse user interface 1005 may access the temp store 1140 to retrieve data corresponding to the edited template. A save may be invoked at 1160, and the template business configuration set data may be saved to configuration workspace 925. In embodiments where communication is permitted back and forth between external components, direct back eventing or notification to the main and original application user interface may be used in place of the temp store 1140.

In one embodiment, template authoring as illustrated at 1100 is a business configuration view reuse plug-in, which may be plugged into an existing business configuration view. There are at least three modes for different use cases. In a first mode a list reuse user interface illustrated at 1200 in FIG. 12 provides a list of templates within a container or a fixed passed list of template-ids is provided. An overview of the templates may be provided in the list mode user interface 1200, and templates or language versions may be edited, added, or deleted as indicated at 1205, 1210 and 1215 respectively. Different regions and industry variants of the templates may also be added or deleted in various embodiments. A language selector 1220 is provided in one embodiment, along with region 1225 and industry 1230 selector lists from which template variants and context attributes may be selected.

In a further embodiment, a single view mode of one template instance may be provided to support BTM cases, fax cover letters for output management or other situations where a list of templates is not required but the application context knows already of one template. In a third mode, a list of template and single edit details for text support is provided. Multiple templates in a template group may be listed to allow in place editing. In these different modes, blank templates may be provided for copying and schema storage. Existing templates may be edited and stored as variants, or as new templates.

In one embodiment, the business configuration template authoring architecture or framework (TAF) provides a mechanism to register plug-in authoring user interfaces for specific mime-types. The plug-ins may contain controls, such as ActiveX controls to embed native design tools, such as Adobe Designer, Excel, Word, etc. For a plug-in, TAF provides a base implementation with functions to invoke modal/dialog 1110 with parameters from the generic TAF business configuration view to pass templates, schemas, etc. Further, communications back to the generic TAF business configuration view 1105 are provided via events to pass changes to templates and schemas back. In one embodiment, the functions are JSP based, allowing the use of such controls.

Template authoring using Adobe plug-ins inherits from the TAF plug-in base implementation. Multiple schema files may be passed to the Adobe Designer and hook in to close/save of the Adobe Designer to return changed templates. With respect to template authoring using Excel, uploads and downloads in the generic TAF business configuration view 1105 are provided. Automation of Excel is similar to the Adobe TAF plug-in, as is automation of text based editors such as Word.

Templates use schemas, which may be considered as binding information which describes how placeholders in a document template are replaced by real business object data for a language variant of the document template. The schemas take into account the organization of the database and identify how to retrieve data for the placeholders. In one embodiment, the data is stored in business objects in a backend that utilizes multi-node hierarchical deep schemas to identify fields in a database. The deep schema is hierarchical in nature, and works well at the database level to access data. However, when creating templates in a design time environment, such deep schemas are not conducive to being easily understood by users, and also may have structures which vary with different database implementations.

In one embodiment, a schema transformation is utilized to convert from the deep schema to a flat schema and back. The flat schema may be used in the design time environment, while the deep schema remains intact for the database, or what is referred to as the back end of a business management system. An example of a schema builder that provides schema transformations is illustrated in block form at 1300 in FIG. 13. A read service 1305 and a write service 1310 are used to read and write data to and from a backend database. The read and write services 1305 and 1310 work with deep schemas as indicated at actions such as response 1315, request 1320 and confirmation 1325. In one embodiment, a root level node has three next levels, A, B and C. Node C has three further nodes at yet a further level, labeled a, b and c. Thus, the deep schema structure in this simple example has three levels, a root, and two deeper levels.

Several XML transformation modules 1330, 1335 and 1340 are coupled to the actions for providing transformation back and forth between a flat schema representation 1350, and the deep schema structures. The transformation modules are labeled as XSLT (Extensible Stylesheet Language Transformation) modules, and operate to track the path in the original deep schema, and exposes "a" as belonging to "C" and is a sub element. Thus when a deep schema is transformed to a flat schema, meta data is tracked to expand the flat schema back out to the deep schema. The flat schema may be easily converted to an XML map as indicated at 1355 and to various other formats for use in editors, such as a spreadsheet 1360, allowing users to view the data in a very user friendly manner, and as a resulting document produced from a template may appear.

In one embodiment, response action 1315 interfaces with read service 1305 to retrieve data from a database using a deep schema. The data is then transformed at 1330 to the flat schema. Similarly, when a write request 1320 is processed, the flat schema is transformed into the deep schema at 1335, and upon confirmation 1325 by the write service 1310, the deep schema is transformed back into the flat schema at 1340.

Schema builder 1300 operates to build a simplified flat schema out of a potentially complex enterprise service repository business object model for use in design time. Such complex object models can be very difficult to comprehend by ordinary users. Vertical schema reduction allows the inclusion or exclusion of associations, nodes and data structures of the complex object model, while keeping track of metadata to enable conversion back and forth. In one embodiment, the data is pushed up to consolidate all the levels on a single node level. A horizontal schema reduction allows the simplification of complex nested structures. The results of the schema transformations may be provided as re-usable net components in one embodiment. Hooks may also be provided for applications to enrich schema nodes with custom markups. The generated schemas may be used by a generic data provider to retrieve business object instances at run time.

Figure 13:
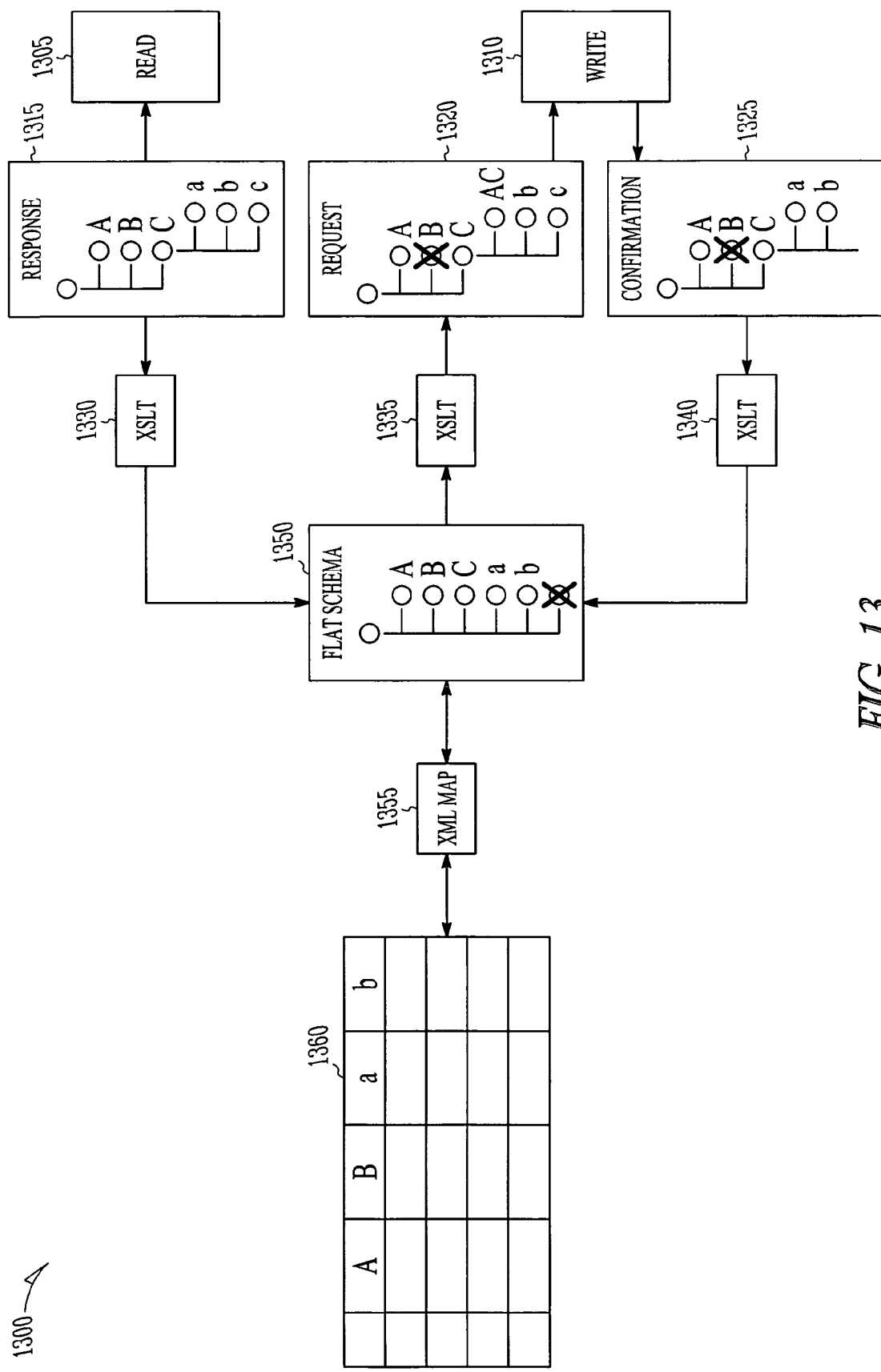
FIG. 13 is a block diagram of a schema builder that provides schema transformations according to an example embodiment.
Figure 14:
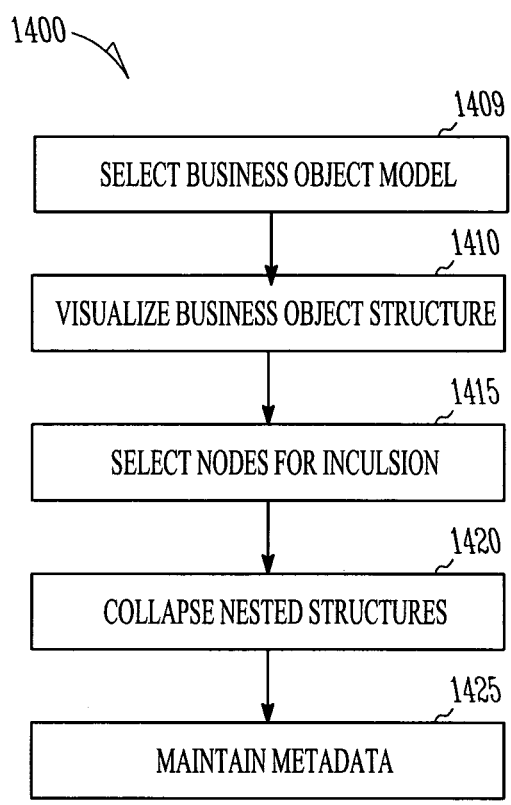
FIG. 14 is a flow chart representation of a schema building process according to an example embodiment.

A schema building process is illustrated in flow chart form at 1400 in FIG. 14. At 1405, a business object model is selected. In one embodiment the business object structure is visualized, illustrating internal and external associations to enhance the visual representation at 1410. A top level of the data structure definition of the business object nodes may be included in the visual representation. Nodes may be selected for inclusion at 1415. As indicated in FIG. 13, in vertical schema building, each node of the visual representation of a business object node is associated with a checkbox. Only checked nodes are included in the custom schema in one embodiment. With respect to horizontal schema building, nested complex structures may be collapsed by virtually inserting them at a higher level of the business object structure as indicated at 1420. Such an operation is also indicated at request 1320 in FIG. 13. Cardinality constraints may be automatically enforced. Meta data is kept as indicated at 1425 to identify where data was in the original deep schema tree structure. The schema building process 1400 assists in optimization and providing a simplified view of the data.

In one embodiment, XSD (XML schema definitions) annotations are used to deliver the transformation. Other notations, such as SAP notations may be used to mark the transformations as indicated in FIG. 15 at 1500 and FIG. 16 at 1600, which are example schema definitions. The transformation may be generated at run time. In further embodiments, a creator of the schema may mark the transformation. For simple scenarios, such mark ups may be considered in normal services, such as read and write services 1305 and 1310 respectively in FIG. 13.

In FIG. 15 at 1500, an element, "Customer" is shown for a flat to deep transformation. A root in a target is identified at 1505, and a destination element is indicated at 1510 at the same level as the root. In FIG. 16 at 1600, an element, "Telephone1" is shown for a flat to deep transformation to A, which is a child node of Telephone. The destination, which may be at a different level, is identified at 1605.

Figure 17:
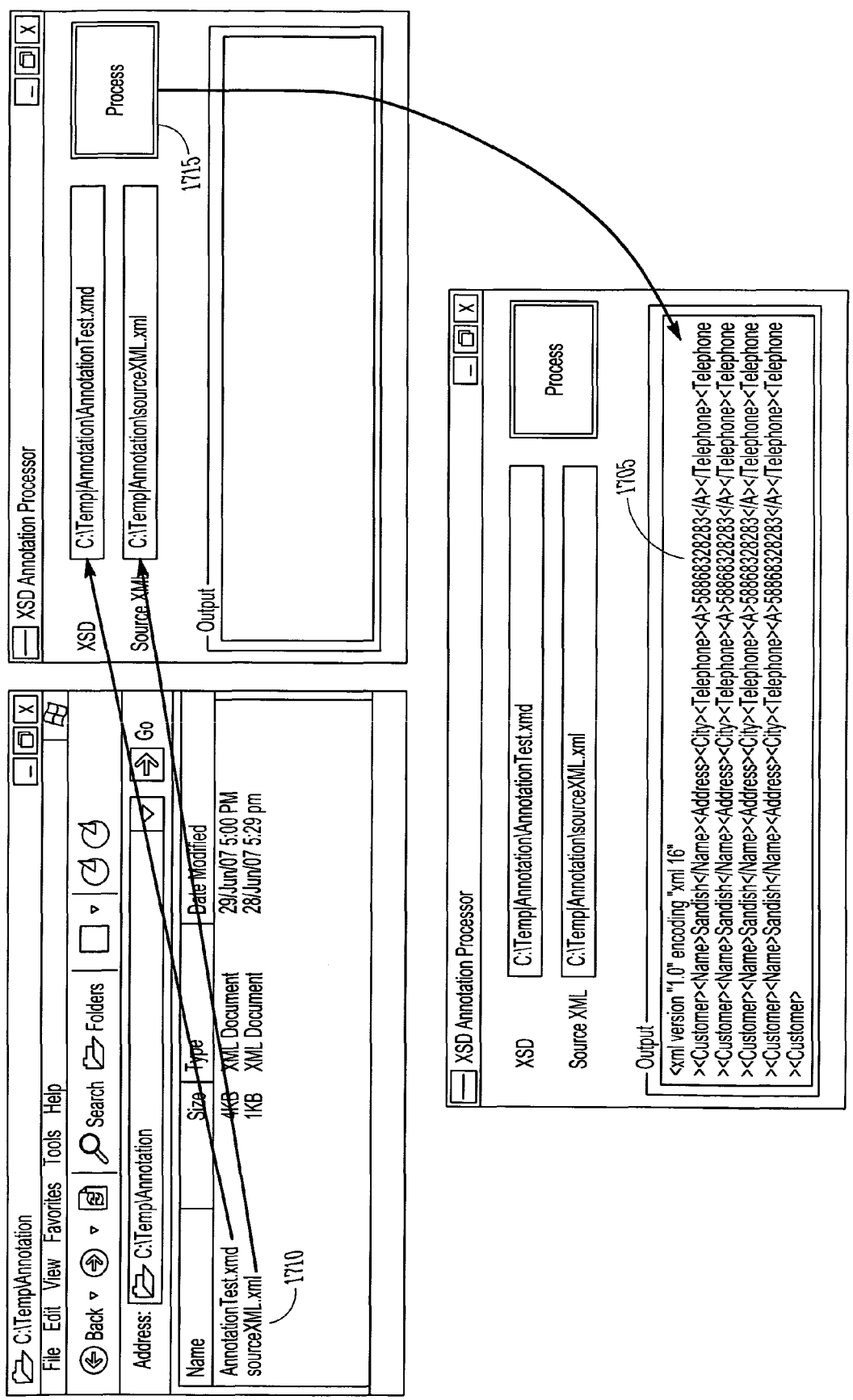
FIG. 17 shows example screen shots illustrating example user interactions for transformations according to an example embodiment.

FIG. 17 provides some screen shots illustrating example user interactions to transform source XML based on transform notations in the XSD, such as those illustrated in FIGS. 15 and 16. The output in one embodiment is the transformed XML at 1705, resulting from a user selecting the XSD and source XML at 1710 and pressing a process button at 1715. This is just one example interface illustrating simple selection of files and initiation of processing. Many other interfaces, including simple command lines or drag and drop interactions may be used in further embodiments.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

What is claimed is:

1. A system providing business management functions for multiple independent entities, the system comprising:
 a hardware processor;
 a template repository coupled to the hardware processor that relates business management applications to customizable templates for each independent entity and stores the customizable templates, wherein the customizable templates are business objects having data defining content and placeholder variables for creating customized templates using the customizable templates, wherein a placeholder variable of the placeholder variables corresponds to a portion of a customizable template of the customizable templates that is configurable by altering a value of the placeholder variable, and wherein the customizable templates and customized templates are organized in the template repository as a deep schema that includes nodes organized in accordance with a node schema that includes a customizable template as a node of the node schema and the variants of the customizable template as sub-nodes of the node, a customized template as another sub-node of the node schema and the variants of the customized template as further sub-nodes of the another sub-node; and
 a user interface module executable by the hardware processor that provides for selection of a customizable template from the customizable templates for a business management application of the business management applications, wherein the multiple customizable templates are provided as a function of a scope of work being done in the business management application, and wherein the customizable templates include variants corresponding to different placeholder variables, variant content, and schemas, wherein the schemas identify binding information in the database that relate a variant of the variants and corresponding variant content of the variant to a placeholder holder variable of the placeholder variables in the customizable template to create the customized templates, wherein the variants include a language variant bound with variant content that defines a language specific version of the customizable template such that the variant content of the variants is consistent with a language specified by the language variant, and wherein the customizable templates, variants of the customizable templates, customized templates, and variants of the customized templates are presented as a customized flat schema that includes nodes and sub-nodes of the deep schema selected using the user interface module, the flat schema created in response to receiving a read request from the user interface module, the flat schema created using an extensible stylesheet language transformation (XSLT) module, wherein the flat schema only includes one level of nodes, wherein the selected nodes and sub-nodes are nodes on the one level of nodes.

2. The system of claim 1 wherein the user interface module facilitates editing of the customizable templates in a business configuration design time environment for each independent entity, and wherein edited templates are associated with a business task such that when run, a schema of the schemas associated with content of the edited templates is used to populate the placeholder variables with the variant content bound to the placeholder variable.

3. The system of claim 2 wherein customizable templates include text based templates, image based templates and spreadsheet based templates.

4. The system of claim 2 wherein the customizable templates are edited in XML format.

5. The system of claim 1 and further comprising a customizable template resolution module that selects a customizable template of the customizable templates and wherein the user interface provides a list of predefined customizable templates as a function of an entity profile that specifies business objects of an entity that are available to that entity profile.

6. The system of claim 5 wherein the customizable template resolution module selects a customizable template as a function of user provided information.

7. The system of claim 6 wherein the user provided information does not directly identify a customizable template.

8. The system of claim 1 wherein the variants comprise industry variants and a time dependency attribute specifying a valid period of time for a template.

9. The system of claim 1 wherein the variants comprise versions, and wherein different versions of customizable templates are persisted separately for use when performing business management functions.

10. A system comprising:
a hardware server providing a business management service to multiple independent customers, wherein the hardware server comprises:
a template repository having predefined templates that are business objects having data defining content and placeholder variables for creating customized documents, the template repository relates business management applications to the customized documents for each independent entity, wherein the predefined templates are business objects having data defining content and placeholder variables for creating the customized documents using the predefined templates, wherein a placeholder variable of the placeholder variables corresponds to a portion of a predefined template of the predefined templates that is configurable by altering a value of the placeholder variable, wherein the template repository includes configuration storage that stores customer changes to the predefined templates that represent the customized documents, and wherein the customizable templates and customized templates are organized in the template repository as a deep schema that includes nodes organized in accordance with a deep schema that includes a customizable template as a node of the deep schema and the variants of the customizable template as sub-nodes of the node, a customized template as another sub-node of the node schema and the variants of the customized template as further sub-nodes of the another sub-node; and
a user interface facilitating selection of a predefined template as a function of scope of work and for fine tuning corresponding to the scope of work, wherein the predefined templates include variants corresponding to different placeholder variables, variant content, and schemas, wherein the schemas identify binding information in the database that relate a variant of the variants and corresponding variant content of the variant to a placeholder holder variable of the placeholder variables in the predefined template to create the customized documents, and
wherein the variants include a language variant bound with variant content that defines a language specific version of the predefined template such that the variant content of the variants is consistent with a language specified by the language variant, and wherein the customizable templates, variants of the customizable templates, customized templates, and variants of the customized templates are presented as a customized flat schema that includes nodes and sub-nodes of the deep schema selected using the user interface, the flat schema created in response to receiving a read request from the user interface, the flat schema created using an extensible stylesheet language transformation (XSLT) module, wherein the flat schema only includes one level of nodes, wherein the selected nodes and sub-nodes are nodes on the one level of nodes.

11. The system of claim 10 wherein the user interface module facilitates editing of the predefined templates in a business configuration design time environment for each independent entity.

12. The system of claim 11 wherein the predefined templates include text based templates, image based templates and spreadsheet based templates.

13. The system of claim 11 wherein the predefined templates are edited in XML format.

14. The system of claim 10 and further comprising a template resolution module that selects a predefined template.

15. The system of claim 14 wherein the predefined template selected by the template resolution module is selected as a function of user provided information.

16. The system of claim 15 wherein the user provided information does not directly identify a predefined template.

17. The system of claim 10 wherein the variants comprise industry variants.

18. A computer implemented method, the method comprising:
providing a business management service to multiple independent customers via a server having a template repository having predefined templates and a configuration storage that stores customer changes to the predefined templates that represent customized templates, wherein the predefined templates are business objects having data defining content and placeholder variables for creating the customized documents using the predefined templates, wherein a placeholder variable of the placeholder variables corresponds to a portion of a predefined template of the predefined templates that is configurable by altering a value of the placeholder variable, wherein the template repository includes that stores customer changes to the predefined templates that represent the customized documents, and wherein the customizable templates and customized templates are organized in the template repository as a deep schema that includes nodes organized in accordance with a deep schema that includes a customizable template as a node of the deep schema and the variants of the customizable template as sub-nodes of the node, a customized template as another sub-node of the node schema and the variants of the customized template as further sub-nodes of the another sub-node; and facilitating selection of a predefined template of the predefined templates via a user interface as a function of scope of work and for fine tuning corresponding to the scope of work, wherein the predefined templates include variants, variant content, and schemas identifying information in the database corresponding to placeholder variables in the variant content to create customized documents, wherein the variants include a language variant bound with variant content that defines a language specific version of the customizable template such that the variant content of the variants is consistent with a language specified by the language variant; and receiving a read request and in response to receiving the read request, using an extensible stylesheet language transformation (XSLT) module to transform the deep schema to a flat schema, wherein the flat schema only includes one level of nodes, wherein the selected customizable templates, variants of the customizable templates, customized templates, and variants of the customized templates are nodes on the one level of nodes.

* * * * *